(12) United States Patent
Lamont

(10) Patent No.: US 6,409,466 B1
(45) Date of Patent: Jun. 25, 2002

(54) HYDRO TURBINE

(76) Inventor: John S. Lamont, 30th Floor-360 Main Street, Winnipeg Manitoba (CA), R3C 3Z3

( * ) Notice: Subject to any disclaimer, the term of this patent is extended or adjusted under 35 U.S.C. 154(b) by 12 days.

(21) Appl. No.: 09/645,314

(22) Filed: Aug. 25, 2000

(51) Int. Cl.$^7$ ................................................. F03B 13/12
(52) U.S. Cl. ......................................... 415/3.1; 415/72
(58) Field of Search ........................... 60/398; 415/4.1, 415/4.2, 4.4, 3.1, 71, 72, 73, 909, 907; 417/334, 336; 290/54

(56) References Cited

U.S. PATENT DOCUMENTS 4,258,271 A * 3/1981 Chappell et al. .............. 290/54
4,274,009 A * 6/1981 Parker, Sr. ................... 290/43

* cited by examiner

Primary Examiner—F. Daniel Lopez
Assistant Examiner—Kimya N McCoy
(74) Attorney, Agent, or Firm—Ryan W. Dupuis; Adrian D. Battison; Michael R. Williams

(57) ABSTRACT

An underwater turbine arrangement is herein described. The water driven turbine comprises a housing having a shaft mounted for rotation about an axis therein. The shaft includes a plurality of flights arranged to drive rotation of the shaft. Mounted onto the housing is a funnel having a mouth greater in size than the housing and a discharge of similar size as the housing. Thus, water entering the funnel is constricted before being passed onto the housing, thereby increasing the force with which the shaft is rotated, thereby increasing the amount of energy produced.

20 Claims, 3 Drawing Sheets

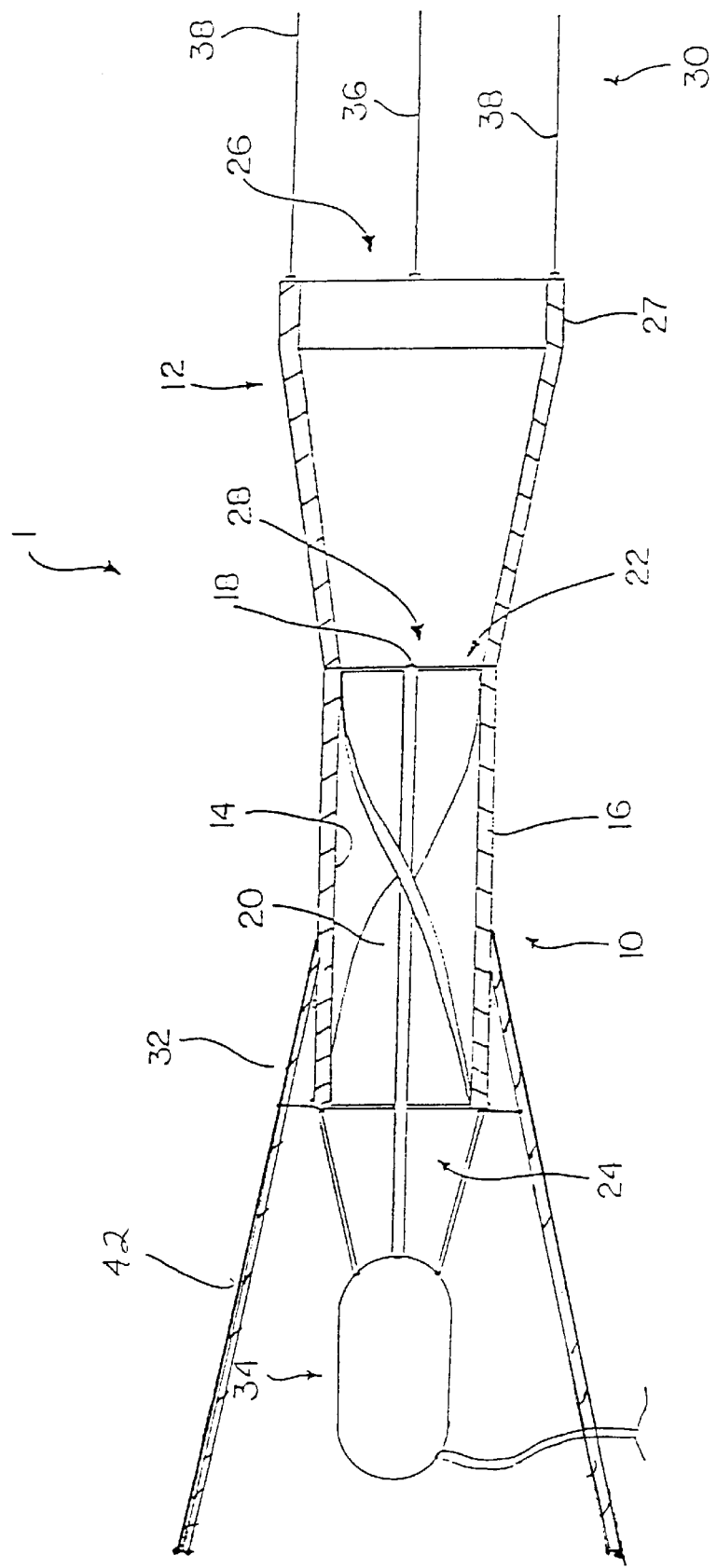

HYDRO TURBINE

U.S. Pat. No. 4,219,303 teaches an underwater power plant which includes electrical generators and machine rooms within the device. Clearly, a device such as this is simply too large for use in streams or rivers and is suitable only for use in ocean currents.

BACKGROUND OF THE INVENTION

There are a number of devices taught in the prior art for converting energy from the flow of a fluid (such as air or water) to electrical energy.

For example, U.S. Pat. No. 4,412,417 teaches a turbine arranged to be anchored on the surface of a body of water for converting "wave energy" to electrical energy. The device includes a shaft having a helical flight displaced therearound, The flight is not enclosed and the waves passing along the flight causes the shaft to rotate, thereby generating electrical power. U.S. Pat. No. 4,849,647 teaches a similar floating turbine that floats on and is exposed to a body of water.

U.S. Pat. No. 5,664,418 teaches a turbine arrangement including vanes for concentrating the wind.

One difficulty faced by devices such as these is that the flow intensity of the fluid, whether wind or wave, is highly variable and dependent upon weather conditions. That is, in conditions wherein there is little or no wind, the above-described device would not produce much power, whereas a strong wind could lead to conditions which would damage the device. As such, these devices are impractical, as the amount of electrical power generated at a given time is highly variable and unpredictable. This is not the case with underwater currents, which are generally more constant both in terms of intensity and direction, making underwater currents more suitable as potential sources for electrical power.

U.S. Pat. No. 4,219,303 teaches an underwater power plant which is includes electrical generators and machine rooms within the device. Clearly, a device such as this is simply too large for use in streams or rivers and is suitable only for use in ocean currents.

U.S. Pat. No. 4,025,220 teaches a turbine for use in water or air which includes a "flexible fluid current collector" for increasing the flow of a fluid, the device being arranged for use in either air or water. It is of note that the collector described is composed of fabric.

Clearly, a device that is arranged for generating electrical power from underwater currents that can also be used in streams and rivers and the like is needed.

SUMMARY OF THE INVENTION

According to the invention, there is provided a water driven turbine for converting the energy of an underwater current comprising: a hollow tubular open ended housing, said housing having an entry end for accepting the water and an exit end for releasing the water; a shaft mounted within the housing, said shaft arranged to rotate within the housing about an axis of rotation; connection means on the shaft for operably linking the shaft to a generator such that rotation of the shaft generates electrical power; blade means arranged about the shaft, said blade means extending along a length of the shaft; and a funnel mounted onto the entry end of the housing, said funnel having a mouth and a discharge, said mouth having a diameter greater than the diameter of the housing, said discharge having a diameter approximately equal to the diameter of the housing, wherein the discharge of the funnel is mounted onto the entry end of the housing such that the water entering the funnel at the mouth passes through the housing and contacts the blade means, thereby rotating the shaft and generating electrical power.

The generator may be positioned behind the exit end of the housing relative to the mouth of the funnel.

The diameter of the mouth may be approximately 50% greater than the diameter of the discharge.

The water driven turbine may include fins mounted on an upper surface and a lower surface of the housing for preventing twisting of the water driven turbine.

The fins may be mounted on the housing proximal to the exit end of the housing.

The water driven turbine may include buoyancy means mounted on the water driven turbine.

The buoyancy means may be mounted within the fins.

There may be three blade means or two blade means.

The water driven turbine may include tether means mounted within the funnel for stabilizing the water driven turbine.

One embodiment of the invention will now be described in conjunction with the accompanying drawings in which:

BRIEF DESCRIPTION OF THE DRAWINGS

FIG. 4 is a side view in cross-section of an alternative arrangement of the turbine.

In the drawings like characters of reference indicate corresponding parts in the different figures.

DESCRIPTION OF THE PREFERRED EMBODIMENTS

Figure 1:
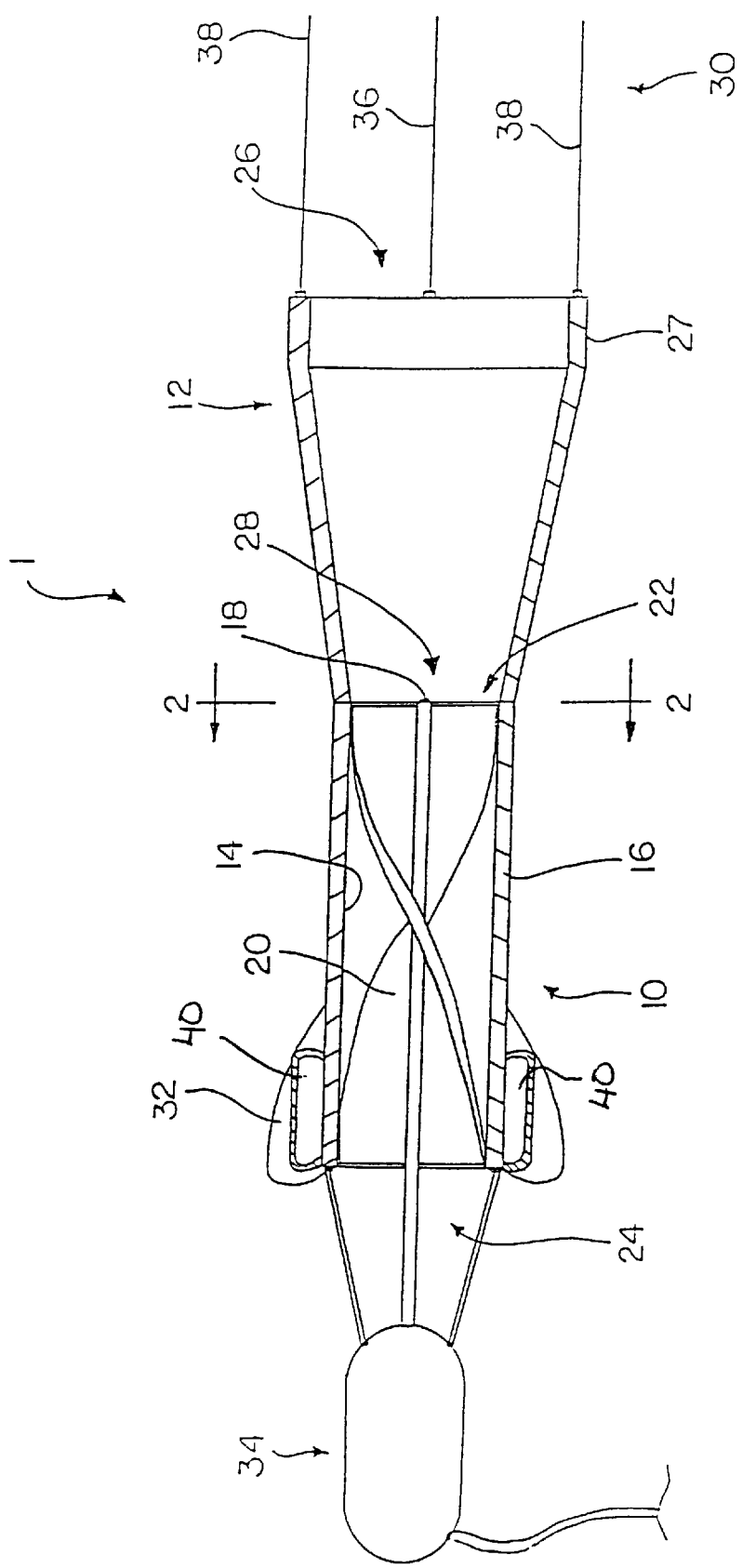
FIG. 1 is a side view in cross-section of the turbine.

Referring to the drawings, a water driven turbine 1 for converting an underwater current into electrical power comprises a housing 10, a funnel 12 and a generator 34.

Figure 2:
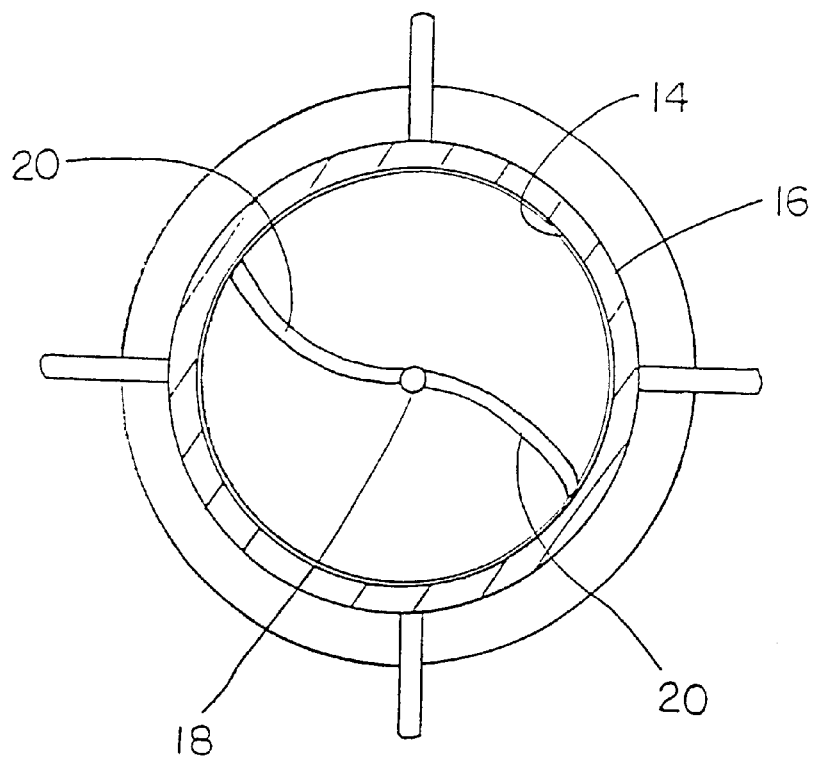
FIG. 2 is a cross-sectional view along line 2—2 in FIG. 1.
Figure 3:
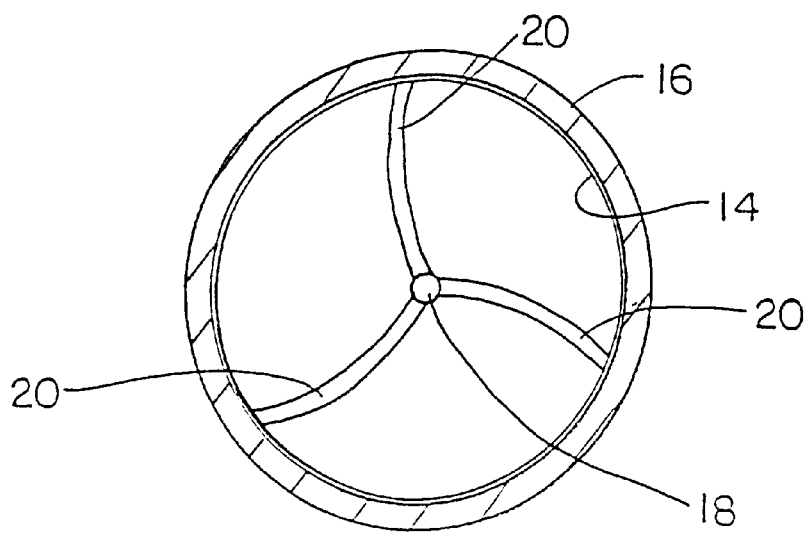
FIG. 3 is a front view of an alternative arrangement of the flight.

As shown in FIG. 1, the housing 10 is tubular, open-ended and hollow, comprising an inner surface 14, an outer surface 16, a shaft 18, an entry end 22 and an exit end 24. The shaft 18 is mounted within the housing 10 such that the shaft 18 rotates within the housing 10 about an axis of rotation, as described below. The shaft 18 includes flights 20 which extend about the shaft 18 along the length of the shaft 18. It is of note that there may be several flights 20 arranged about the shaft, depending upon conditions and the intended use. For example, FIGS. 1 and 2 show an embodiment of the invention wherein there are two flights whereas FIG. 3 shows an embodiment having three flights. As will be apparent to one knowledgeable in the arts, the three flight shaft will have a larger surface area than the two flight shaft. In the embodiment shown in FIG. 1, the flights 20 extend around the shaft 18 in a helical or twisted arrangement. Specifically, the flights 20 are struck by a flow of water passing through the housing 10 which in drives rotation of the shaft 18, as described below. However, it is of note that other suitable arrangements of flights 20 known in the art may also be used. It is of note that the shaft 18 may be mounted within the housing 10 in a hub such that the shaft 18 can rotate freely. The hub is mounted to the housing by a plurality of legs, the legs being arranged so as to minimize their interference with water flow through the water driven turbine 1.

The funnel 12 is composed of a rigid material and comprises a mouth 26 and a discharge 28. It is of note that the mouth 26 is arranged to be of a greater diameter than the discharge 28 for increasing the velocity and inertial force in the flow of water as it passes through the funnel 12 compared to the current as described below. Furthermore, as can be seen in FIG. 1, the decrease in diameter between the mouth 26 and the discharge 28 is gradual, so that water is not forced out of the water driven turbine 1, as water diverted away from the water driven turbine 1 cannot be used to drive the shaft 18 and is in effect wasted energy. Furthermore, as can be seen in FIG. 1, the mouth 26 includes a lip 27 that is of a fixed diameter and acts to retain incoming water flow, as described below. Specifically, in the embodiment shown in FIG. 1, the diameter of the mouth 26 is approximately 50% greater than that of the discharge 28. As a result of this arrangement, the surface area at the mouth 26 of the funnel 12 is greater than the surface area at the discharge 28. Furthermore, as shown in FIG. 1, the discharge 28 is of a similar diameter as the entry end 22 of the housing 10. It is of note that other ratios may also be utilized, according to the conditions in which the water driven turbine 1 is to be used.

In the embodiment shown in FIG. 1, tether means 30 are connected to the funnel 12 for anchoring the water driven turbine 1 in the waterway. Specifically, the tether means 30 comprises side cables 36 and top and bottom cables 38 which are mounted to the front face of the lip 27, as shown in FIG. 1. The cables 38 are connected to a support structure (not shown) for securing and stabilizing the water driven turbine 1 in the underwater current, as described below. In addition, in the embodiment shown in FIG. 1, the water driven turbine 1 includes fins 32 for further stabilizing the position of the water driven turbine 1 in the waterway. In the embodiment shown in FIG. 1, the fins 32 are mounted on the outer surface 16 of the housing 10 above and below the shaft 18, proximal to the exit end 22. Thus, as a result of the tethering means 30 and the fin 32, the water driven turbine 1 will not rotate, twist or turn when exposed to the water current, meaning that maximum efficiency is retained. That is, the water driven turbine 1 remains positioned within the water flow such that the maximum flow of water is directed through the water driven turbine 1. As will be appreciated by one knowledgeable in the art, other tether means 30 or fins 32 at other locations along the water driven turbine 1 may also be used for stabilizing the water driven turbine 1.

As can be seen in FIG. 1, the shaft 18 is operably linked to the generator 34. The details of the generator are not shown as these will be well known to one knowledgeable in the art. It is of note that in the embodiment shown in FIG. 1, the shaft 18 is connected directly to the generator 34 and the generator 34 is mounted to the housing 10 behind the exit end 22. Specifically, the generator 34 is mounted to the exit end 22 of the housing 10 by support bars such that the shaft 18 is connected to the generator in a straight line. In other embodiments, the generator 34 may be located at a distance to the water driven turbine 1. It is of note that in some embodiments the generator 34 may be positioned in a non-linear arrangement relative to the shaft 18 using means known in the art.

It is of note that in the embodiment shown in FIG. 1, the fins 32 include buoyancy means 40 within the fins 32 for counter-acting the weight of the generator 34. That is, as discussed above, the fins 32 are mounted proximal to the exit end 22 and therefore proximal to the generator 34, for counter-balancing the weight of the generator 34. As a result of this arrangement, the water driven turbine 1 does not tilt when in use.

For use, the funnel 12 is mounted onto the housing 10 such that the entry end 22 of the housing 10 contacts the discharge 28 of the funnel 12. The water driven turbine 1 is then lowered into the body of water, below the surface of the body of water and the water driven turbine 1 is positioned such that the water current flows through the water driven turbine 1 as described below. Specifically, the water driven turbine 1 is positioned such that the current in the body of water directs the flow of water directly into the mouth 26 of the funnel 12. It is of note that the shaft 18 is operably linked to the generator 34, as described below.

In use, as discussed above, the water driven turbine 1 is positioned such that the current in the body of water directs water to flow into the mouth 26 of the funnel 12 at the lip 27. As discussed above, the diameter of the mouth 26 of the funnel 12 is greater than the diameter of the discharge 28 of the funnel. As a result of this arrangement, the velocity and inertial force of the water flow increases as it passes through the funnel 12 from the mouth 26 to the discharge 28. In this manner, the inertial force and velocity of the water is increased relative to the water flow caused by the natural current in the body of water. As noted above, the lip 27 is of a fixed diameter and acts to prevent backflow of the water once it enters the funnel 12. Furthermore, once water enters the funnel 12, it must exit through the exit end 24 of the housing 10 and the funnel 12. Thus, the flow of water passes through the housing 10 at the entry end 22 and exits the housing 10 through the exit end 24. As the water passes through the housing 10, the water strikes the flights 20, thereby driving rotation of the shaft 18. Rotation of the shaft 18 in turn generates electrical power at the generator 34. It is of note that the flights 20 are fitted within the housing 10 for maximum surface area and minimum clearance within the housing 10 so that the shaft 18 rotates freely within the housing 10. That is, the flights 20 are arranged to have maximum surface area and are arranged about the shaft 18 to maximize contact with the flow of water, so that electrical power generation is more efficient. Specifically, once the flow of water enters the water driven turbine 1, it must pass over the flights 20. Furthermore, the funnel 12 increases the velocity of the flow of water and passes the flow of water directly to the housing 10 without allowing water to flow back out of the funnel and escape, as discussed above.

In an alternative embodiment, the water driven turbine 1 includes a cone 42 mounted to the housing 10 and extending past the exit end 24, as shown in FIG. 4. Specifically, the cone 42 is connected to and extends outwardly and rearwardly from a position on the housing 10 past the exit end 24. Furthermore, the cone 42 may be connected to the housing at positions proximal to the exit end 24, as shown in FIG. 4. It is also of note that the cone 42 increases in diameter while extending rearwardly from the housing 10, such that the cone 42 is most narrow at the point that is mounted to the housing 10 and most wide at the distal end of the cone 42 relative to the housing 10. As a result of this arrangement, water exiting avoids the turbulence and restraining effect which would result from contact with the flow of water passing outside the device at the immediate exit, and the expanded volume available to the exiting water will enhance the velocity of flow throughout the device by eliminating some back pressure. Further, the cone will increase the velocity of flow of the water passing outside of the cone, which in turn will have a pulling effect on the water exit from inside the cone, enhancing its velocity of flow.

Thus, the above-described water driven turbine 1 is arranged for converting underwater currents to electrical power. Furthermore, the design is such that the water driven turbine 1 can be used in bodies of water such as lakes, streams and rivers, where prior art water driven turbines are not suitable or impractical. Specifically, the water driven turbine is arranged to increase velocity in a natural water flow and to direct the water over a plurality of flights. Water passing over the flights drives rotation of a shaft which is in turn linked to a generator, resulting in the production of electrical power.

While the preferred embodiments of the invention have been described above, it will be recognized and understood that various modifications may be made therein, and the appended claims are intended to cover all such modifications which may fall within the spirit and scope of the invention.

What is claimed is:

1. A water driven turbine for converting the energy of an underwater current comprising:
   a hollow tubular open ended housing, said housing having an entry end for accepting the water and an exit end for releasing the water;
   a shaft mounted within the housing, said shaft arranged to rotate within the housing about an axis of rotation;
   connection means on the shaft for operably linking the shaft to a generator such that rotation of the shaft generates electrical power;
   blade means arranged about the shaft, said blade means extending along a length of the shaft;
   a funnel mounted onto the entry end of the housing, said funnel having a mouth and a discharge, said mouth having a diameter greater than the diameter of the housing, said discharge having a diameter approximately equal to the diameter of the housing; and
   tether means mounted on the funnel for stabilizing the water driven turbine;
   wherein the discharge of the funnel is mounted onto the entry end of the housing such that the water entering the funnel at the mouth passes through the housing and contacts the blade means, thereby rotating the shaft and generating electrical power.

2. The water driven turbine according to claim 1 wherein the generator is positioned behind the exit end of the housing relative to the mouth of the funnel.

3. The water driven turbine according to claim 1 wherein the diameter of the mouth is approximately twice the diameter of the discharge.

4. The water driven turbine according to claim 1 including fins mounted on an upper surface and a lower surface of the housing for preventing twisting of the water driven turbine.

5. The water driven turbine according to claim 4 wherein the fins are mounted on the housing proximal to the exit end of the housing.

6. The water driven turbine according to claim 5 including buoyancy means mounted on the water driven turbine.

7. The water driven turbine according to claim 6 wherein the buoyancy means are mounted within the fins.

8. The water driven turbine according to claim 1 wherein there are three blade means.

9. The water driven turbine according to claim 1 wherein there are two blade means.

10. The water driven turbine according to claim 1 wherein the funnel includes a lip of fixed diameter adjacent to the mouth for preventing backflow.

11. The water driven turbine according to claim 1 including a cone mounted to the housing, said cone extending rearwardly beyond the exit end.

12. The water driven turbine according to claim 12, wherein the diameter of the cone increases as the cone extends rearwardly.

13. A water driven turbine for converting the energy of an underwater current comprising:
   a hollow tubular open ended housing, said housing having an entry end for accepting the water and an exit end for releasing the water;
   a shaft mounted within the housing, said shaft arranged to rotate within the housing about an axis of rotation;
   connection means on the shaft for operably linking the shaft to a generator such that rotation of the shaft generates electrical power;
   blade means arranged about the shaft, said blade means extending along a length of the shaft; and
   a funnel mounted onto the entry end of the housing, said funnel having a mouth, a discharge and a lip of fixed diameter projecting from the mouth for preventing backflow, said mouth having a diameter greater than the diameter of the housing, said discharge having a diameter approximately equal to the diameter of the housing;
   wherein the discharge of the funnel is mounted onto the entry end of the housing such that the water entering the funnel at the mouth passes through the housing and contacts the blade means, thereby rotating the shaft and generating electrical power.

14. The water driven turbine according to claim 13 including tether means mounted within the funnel for stabilizing the water driven turbine.

15. The water driven turbine according to claim 13 wherein the generator is positioned behind the exit end of the housing relative to the mouth of the funnel.

16. The water driven turbine according to claim 13 wherein there is provided buoyancy means adjacent the exit end of the housing.

17. The water driven turbine according to claim 13 wherein the generator is positioned at the exit end of the housing and wherein there is provided buoyancy means supporting the exit end of the housing and tether means supporting the entry end of the housing.

18. A water driven turbine for converting the energy of an underwater current comprising:
   a hollow tubular open ended housing, said housing having an entry end for accepting the water and an exit end for releasing the water;
   a shaft mounted within the housing, said shaft arranged to rotate within the housing about an axis of rotation;
   connection means on the shaft for operably linking the shaft to a generator such that rotation of the shaft generates electrical power, the generator being located adjacent the exit end of the housing;
   blade means arranged about the shaft, said blade means extending along a length of the shaft;
   a funnel mounted onto the entry end of the housing, said funnel having a mouth and a discharge, said mouth having a diameter greater than the diameter of the housing, said discharge having a diameter approximately equal to the diameter of the housing;
   tether means supported adjacent the funnel at the entry end of the housing for stabilizing the water driven turbine; and
   buoyancy means adjacent the exit end of the housing for supporting the generator;
   wherein the discharge of the funnel is mounted onto the entry end of the housing such that the water entering the funnel at the mouth passes through the housing and contacts the blade means, thereby rotating the shaft and generating electrical power.

19. The water driven turbine according to claim 18 wherein there are provided fins supported on the housing adjacent the exit end of the housing, the buoyancy means being supported within the fins.

20. The water driven turbine according to claim 18 wherein the tether means are supported on the funnel.

* * * * *